United States Patent [19]
Nishiyuki et al.

[11] Patent Number: 5,978,932
[45] Date of Patent: Nov. 2, 1999

[54] STANDBY REDUNDANCY SYSTEM

[75] Inventors: Hiroshi Nishiyuki; Noboru Sakamoto, both of Tokyo, Japan

[73] Assignee: Mitsubishi Denki Kabushiki Kaisha, Tokyo, Japan

[21] Appl. No.: 08/916,449

[22] Filed: Aug. 22, 1997

[30]       Foreign Application Priority Data

Feb. 27, 1997  [JP]  Japan ..................................... 9-943954

[51] Int. Cl.$^6$ ................................................. G06F 12/14
[52] U.S. Cl. .................... 714/11; 714/13; 714/6
[58] Field of Search ................................. 714/11, 6, 10, 714/12, 13, 15, 20

[56]                References Cited

U.S. PATENT DOCUMENTS

| 3,964,055 | 6/1976 | Carruet et al. .......................... 395/311 |
| 4,564,900 | 1/1986 | Smitt .................... 395/200.42 |
| 5,249,187 | 9/1993 | Bruckert et al. .................... 395/182.09 |
| 5,751,955 | 5/1998 | Sonnier et al. ....................... 395/182.1 |
| 5,841,963 | 5/1997 | Nakamikawa et al. ............ 395/182.11 |
| 5,857,208 | 5/1996 | Ofek ................................... 395/182.04 |

FOREIGN PATENT DOCUMENTS 2-81101  of 0000  Japan .

Primary Examiner—Robert W. Beausoliel, Jr.
Assistant Examiner—Wasseem Mamdan
Attorney, Agent, or Firm—Sughrue, Mion, Zinn, Macpeak & Seas, PLLC

[57]                ABSTRACT

A standby redundancy system comprising a control CPU unit for controlling controlled machines and a standby CPU unit capable of controlling the controlled machines instead of the control CPU unit, characterized by tracking unit for temporarily storing a command consisting of a statement and data entered from a peripheral machine, processing the data based on the statement in the command, and transferring the temporarily stored command to the associated CPU unit.

8 Claims, 12 Drawing Sheets

STANDBY REDUNDANCY SYSTEM

BACKGROUND OF THE INVENTION

1. Field of the Invention

This invention relates to a standby redundancy system of a programmable controller used with industrial machines, etc., the standby redundancy system being made up of a control CPU unit for actually controlling controlled machines and a standby CPU unit for controlling the controlled machines successively when the control CPU unit goes down for some reason so that the control and standby CPU units can be made the same in files, control information, and the operation mode.

2. Description of the Related Art

FIG. 10 is a block diagram to show the configuration of a conventional standby redundancy system shown in Japanese Patent Laid-Open No. Hei 2-81101, for example.

In the figure, numeral 10 is a control CPU unit for controlling controlled machines online. Numeral 110 is a standby CPU unit for controlling the controlled machines instead of the control CPU unit 10 when the control CPU unit 10 fails, etc. Numeral 5 is a switch for switching the lines connecting input/output of the CPU units and the controlled machines, and numeral 6 is a transmission line for transferring information required for backup.

Input/output of the two CPU units is connected to the controlled machines through the switch 5.

The standby CPU unit 110 serves the feed of the backup function of the control CPU unit 10 although it does not execute actual control. Therefore, the standby CPU unit 110 has the same hardware configuration as the control CPU unit 10 and the CPU units are also have the same in data contained in the internal programs, etc.

Thus, the standby CPU unit 110 always receives tracking information from the control CPU unit 10 over the transmission line 6.

The tracked information includes input information indicating the controlled machine state, control output information, standard programs, intermediate result and result data of calculation of control algorithms executed by application programs, application programs, parameters used in control operations, etc.

Next, a general tracking technique will be discussed with reference to a flowchart in FIG. 11.

First, at step S1100, system information of the control CPU unit and device information of the control CPU unit having a range preset by the user before running are extracted and control goes to step S1101.

At step S1101, the information extracted in the control CPU unit is transferred to a tracking memory in the standby CPU unit.

At step S1102, the information transferred to the tracking memory in the standby CPU unit is reflected in either a device memory or a system memory.

However, the tracking shown in Japanese Patent Laid-Open No. Hei 2-81101 is only a technique for holding the identity of the data changed after the system is started up, namely, between the operating control CPU unit and the standby CPU unit.

Thus, the programs, data, etc., required when the system is started up cannot be tracked and their identity cannot be held between the control and standby CPU units.

Generally, data in a preset range of a memory area according to a parameter set by the user is to be tracked, thus data, etc., stored in areas different from the memory area storing the tracked data is not tracked as tracking data and the data identity cannot be held between the control and standby CPU units.

Thus, from the viewpoint of tracking reliability, a method described below is used to set programs and data between the control and standby CPU units.

A setting method of programs, data, etc., for executing communication functions such as file batch write means and device batch write means for the control and standby CPU units in the standby redundancy system will be discussed with reference to FIGS. 12 and 13A to 13C.

As described above, in the standby redundancy system, both the control and standby CPU units need to be made the same in programs and data.

Thus, in a STOP mode, a peripheral device is connected to the target CPU unit by a communication line and the file batch write means and the device batch write means in the CPU unit write the file contents and device information transferred from the peripheral device into the target memory, namely, either the device memory or program memory in response to a batch write request of programs, data, etc., from the peripheral device. At the write time, the CPU unit checks the controlled area, etc., of the written programs, data, etc. (Steps S1200 and S1201).

Upon normal completion of batch write command execution from the peripheral device, response data is prepared at step S1202 and a response indicating the completion is returned to the peripheral device at step S1203 (FIG. 13A).

Then, connection of the peripheral device is changed to the standby CPU unit (FIG. 13B) and the same write processing is executed for the standby CPU unit based on FIG. 10 (FIG. 13C).

Next, transfer of the file contents in the program memory, the device memory, and an external memory of the control CPU unit to the corresponding memories of the standby CPU unit (program memory, device memory, and external memory) will be discussed.

First, from the peripheral device, the file batch write means and the device batch write means are executed for the control CPU unit based on FIG. 12 (FIG. 13A) for once reading data in the control CPU unit into the peripheral device.

After this, connection of the peripheral device must be changed to the standby CPU unit (FIG. 13B) for writing the information read from the control CPU unit into the target memory of the standby CPU unit by the file batch write means and the device batch write means of the communication service functions (FIG. 13C).

To write the program files into the program memory of the target CPU unit in batch from the peripheral device, if the CPU unit operation mode is RUN, it needs to be changed to STOP.

The operation mode change from RUN to STOP or from STOP to RUN is made by manually changing an operation mode changeover switch of the standby CPU unit matching change in the control CPU unit operation mode to make the standby CPU unit operation mode the same as the control CPU unit operation mode in the standby redundancy system.

As described above, to provide the identity of data that cannot be tracked between the control and standby CPU units, a peripheral device needs to be connected separately to both the CPU units for holding the data identity; it is extremely intricate to provide the data identity.

Generally, to change a part of a program, the changed program is written from a peripheral device at the END processing time in the RUN mode. However, the capacity of the program that can be written from the peripheral device over a communication line is limited within the limited time of the END processing.

Further, due to recent trends in modular programming, if programs are put into modules and are associated closely with each other to form a larger program, it is often efficient from the viewpoint of work efficiency and program reliability to change the entire program part in one module block rather than a part of the program in the block.

Further, at the END processing time in the RUN mode, the RUN mode is changed to the STOP mode in which programs are written in batch from a peripheral device. Therefore, the controlled machines must be stopped and the work efficiency is lowered.

The tracking, which recognizes all the data in the setup range as tracking data, also recognizes unchanged data as tracking data, prolonging the time taken for the tracking.

SUMMARY OF THE INVENTION

It is therefore a first object of the invention to improve work efficiency for holding data identity in a standby redundancy system.

It is a second object of the invention to further improve reliability of data identity.

It is a third object of the invention to enable a batch program change even during the RUN mode in a standby redundancy system for improving work efficiency.

It is a fourth object of the invention to improve reliability of programs written in batch during the RUN mode.

It is a fifth object of the invention to reliably synchronize programs written in batch during the RUN mode.

It is a sixth object of the invention to provide efficient tracking in a standby redundancy system.

It is a seventh object of the invention to cope with operation state change in a standby redundancy system as soon as possible and change the operation mode efficiently.

According to the invention, a standby redundancy system comprising a control CPU unit for controlling controlled machines and a standby CPU unit capable of controlling the controlled machines instead of the control CPU unit, characterized by tracking means for temporarily storing a command consisting of a statement and data entered from a peripheral machine, processing the data based on the statement in the command, and transferring the temporarily stored command to the associated CPU unit.

The associated CPU unit to which the temporarily stored command is transferred processes the data based on the statement in the command, detects an error in the command, and returns a notification indicating the error to the peripheral machine through the CPU unit transferring the command.

According to the invention, a standby redundancy system is provided comprising a first CPU unit for temporarily storing a command consisting of a statement and a program entered from a peripheral machine, storing the program in a first external memory internally connected based on the statement in the command while checking the command for error, and transferring the temporarily stored command to a second CPU unit, and a second CPU unit for storing the program in a second external memory internally connected based on the statement in the transferred command while checking the command for error, and returning the check result to the first CPU unit, characterized in that the program stored in the first and second external memories is written into the corresponding memories during the RUN mode based on a sequence program.

Further, the error check is made by scanning the program.

If an error is not detected in the first or second CPU unit, the program stored in the first and second external memories is written into the corresponding memories during the RUN mode in response to a request issued from the peripheral machine.

Also, if an error is not detected in the first or second CPU unit, the program stored in the first and second external memories is written into the corresponding memories during the RUN mode in response to a request issued from the first or second CPU unit.

According to the invention, a standby redundancy system is provided comprising a control CPU unit for controlling controlled machines and a standby CPU unit capable of controlling the controlled machines instead of the control CPU unit, characterized in that change in data in a predetermined area of an internal memory is detected, a change detection address and updated data are stored in sequence, and only the address and updated data stored are transferred to the standby CPU unit at data tracking time.

According to the invention, there is provided a standby redundancy system comprising a control CPU unit for controlling controlled machines and a standby CPU unit capable of controlling the controlled machines instead of the control CPU unit, characterized in that the operation state of the control CPU unit is stored for each scan and each time the scan terminates, the current operation state is compared with the operation state set before one scan and if operation state change is detected, a command for changing the operation state is issued to the standby CPU unit.

BRIEF DESCRIPTION OF THE DRAWINGS

Other objects, features, and advantages of the present invention will be apparent when carefully reading the following detailed description in connection with the accompanying drawings, in which.

DETAILED DESCRIPTION OF THE PREFERRED EMBODIMENTS

Now, a description will be given in more detail of embodiments of the present invention with reference to the accompanying drawings.

Embodiment 1

A first embodiment of the invention will be discussed with reference to the accompanying drawings.

Figure 1:
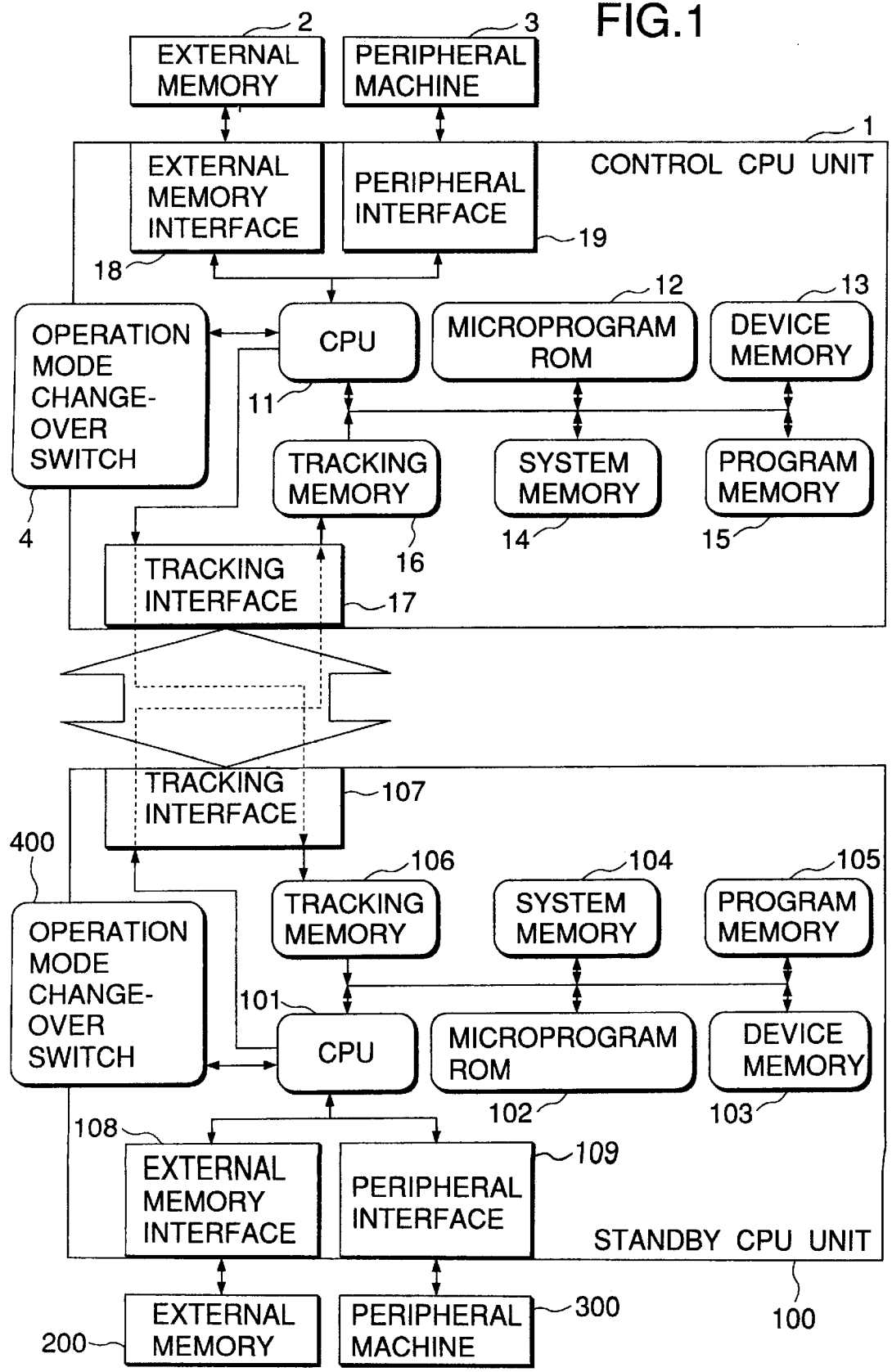
FIG. 1 is a block diagram to show a general configuration of a programmable controller (PC) of a standby redundancy system in embodiments of the invention.

FIG. 1 is a block diagram showing a general configuration of a programmable controller (PC) of a standby redundancy system. In the figure, numeral 1 is a control CPU unit 1 for actually controlling controlled machines and numeral 100 is a standby CPU unit for controlling the controlled machines successively when the control CPU unit goes down for some reason. Numeral 2, 200 is an external memory for storing file registers and program files connected to the corresponding CPU unit by an internal bus, etc. Numeral 3, 300 is a peripheral device being connected to the corresponding CPU unit by a communication line for the user to prepare programs and store them in the PC. Numeral 4, 400 is an operation mode changeover switch for manually changing the operation mode from STOP to RUN or from RUN to STOP.

Numeral 11 is a CPU for executing programs, numeral 12 is a microprogram ROM (read-only memory) for storing microprograms as an operating system for controlling the CPU 11, numeral 13 is a device memory for storing device information, numeral 14 is a system memory for storing system information for controlling the CPU 11, numeral 15 is a program memory for storing sequence programs, numeral 16 is a tracking memory for storing tracking data between the control and standby CPU units 1 and 100 in the standby redundancy system, numeral 17 is a tracking interface for transferring tracking data to and from the associated CPU unit in the standby redundancy system, numeral 18 is an external memory interface for transferring data to and from the external memory 2, and numeral 19 is a peripheral interface for transferring data to and from the peripheral device 3.

The standby CPU unit 100 has the same internal configuration as the control CPU unit 1. That is, the standby CPU unit 100 contains a CPU 101, a microprogram ROM 102, a device memory 103, a system memory 104, a program memory 105, a tracking memory 106, a tracking interface 107, an external memory interface 108, and a peripheral interface 109 corresponding to the CPU 11, the microprogram ROM 12, the device memory 13, the system memory 14, the program memory 15, the tracking memory 16, the tracking interface 17, the external memory interface 18, and the peripheral interface 19 respectively.

Figure 2:
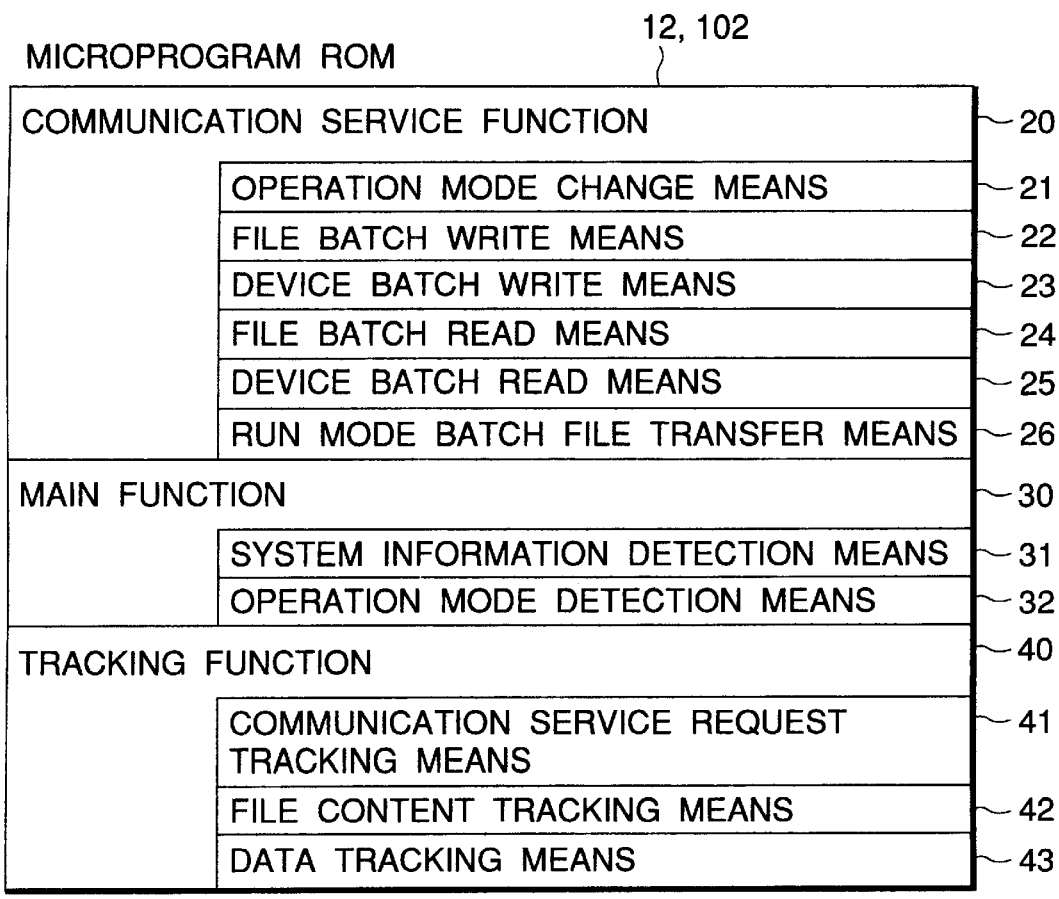
FIG. 2 is a detailed block diagram to show the internal functions of a microprogram ROM according to a first embodiment of the invention.

FIG. 2 is a memory block diagram to show the details of the internal functions of the microprogram ROM 12, 102 according to the first embodiment of the invention.

In the embodiment, the principal functions of the microprogram ROM 12, 102 include a communication service function 20 concerning communication service for controlling data transfer between the peripheral device 3 and the CPU unit 1, 100 and operation commands sent from the peripheral device 3 to the CPU unit 1, 100, a main function 30 for detecting information change and state change between the control and standby CPU units 1 and 100, and a tracking function 40 for controlling data transfer between the control and standby CPU units 1 and 100 in the standby redundancy system.

The communication service function 20 has detailed means of operation mode change means 21 for changing the operation mode to a specified operation mode in response to a command from the peripheral device 3, file batch write means 22 for writing files in batch from the peripheral device 3 into the specified program memory 15 or external memory 2, device batch write means 23 for writing device values in batch from the peripheral device 3 into the device memory 13, file batch read means 24 for reading specified files in the specified program memory 15 or external memory 2 of the CPU unit 1 in batch into the peripheral device 3, device batch read means 25 for reading specified device values in the device memory 13 of the CPU unit 1 in batch into the peripheral device 3, and RUN mode batch file transfer means 26 for transferring files previously residing in the external memory 2 to the program memory during the RUM mode (at the end processing time after the termination of scanning).

The main function 30 has detailed means of system information detection means 31 for automatically detecting system information change and transmitting changed system information to the associated CPU unit and operation mode detection means 32 for detecting operation state change of the target CPU unit and transmitting detected operation mode change to the associated CPU unit.

Further, the tracking function 40 has detailed means of data tracking means 43 for transferring system information of the control CPU unit 1 and device information of the control CPU unit 1 in the user-specified range to the standby CPU unit 100, communication service request tracking means 41, upon reception of a communication service request for the control CPU unit 1 in the standby redundancy system from the peripheral device 3, for sending the same communication service request to the standby CPU unit 100 through a tracking unit, and file content tracking means 42 for transferring the file contents in the program memory 15 and external memory 2 of the control CPU unit 1 to the corresponding program memory 105 and external memory 200 of the standby CPU unit 100.

Figure 3:
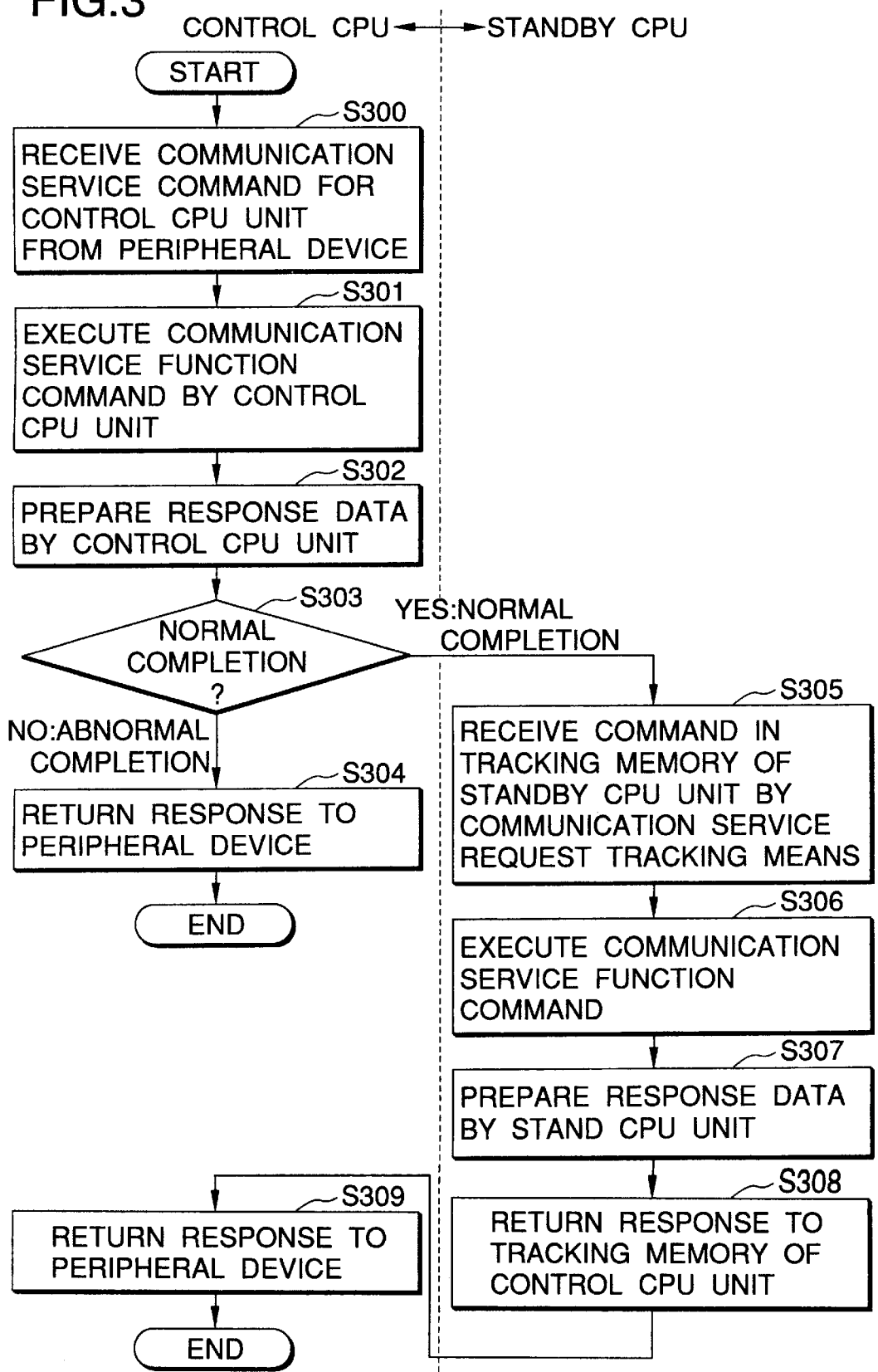
FIG. 3 is a flowchart to show the operation of communication service request tracking means in the first embodiment of the invention.

FIG. 3 is a flowchart to show the operation of the communication service request tracking means 41 in detail.

When a command of the communication service function 20 is issued from the peripheral device 3 connected to the target CPU unit to the control CPU unit 1 and is received by the control CPU unit 1 at step S300, the communication service function 20 in the microprogram ROM 12 responsive to the transmitted command contents is executed at step S301.

That is, the CPU 11 interprets the instruction at the top of the transmitted command, any program in the microprogram ROM 12 corresponding to the instruction is started, and the CPU 11 executes processing of data following the instruction based on the program. At this time, the control CPU unit 1 checks whether or not command processing can be actually controlled; the CPU 11 checks controlled areas, etc., of the program, data, etc., to see if the program, data, etc., is actually valid.

The CPU 11 stores all commands transmitted from the peripheral machine 3 in the system memory 14 as they are.

Upon completion of the processing responsive to the transmitted command at step S301, control goes to step S302 and response data indicating the normal or abnormal completion to the peripheral device 3 is prepared.

After this, at step S303, whether or not execution of step S301 is normally complete is checked.

If the execution is abnormally complete, control goes to step S304 and the response prepared at step S302 is returned to the peripheral device 3 and the process is terminated.

If the execution is normally complete at step S303, the response prepared at step S302 is discarded and the communication service request tracking means 41 issues the same command as the command of the communication service function 20 received by the control CPU unit 1 at step S300 to the tracking memory 106 of the standby CPU unit 100. Specifically, it issues the received command stored in the system memory 14 to the standby CPU unit 100 through the tracking interface 17.

When the standby CPU unit 100 receives the same command as the command issued from the peripheral device 3 and it is stored in the tracking memory 106 through the tracking interface 107 from the control CPU unit 1 at step S305, the means in the communication service function responsive to the transmitted command contents executes processing at step S306. To execute the command, the CPU 101 interprets the instruction at the top of the transmitted command, any program in the microprogram ROM 102 corresponding to the instruction is started, and the CPU 101 executes processing of data following the instruction based on the program. At this time, the standby CPU unit 100 checks whether or not command processing can be actually controlled.

Upon completion of the processing responsive to the transmitted command at step S306, control goes to step S307 and response data indicating the normal or abnormal completion to the control CPU unit 1 is prepared. Then, at step S308, the response data is transferred to the tracking memory 16 of the control CPU unit 1.

Upon reception of the response data indicating the normal or abnormal completion from the standby CPU unit 100, at step S309 the control CPU unit 1 returns the received response data to the peripheral device 3 issuing the command of the communication service function to the control CPU unit 1 at step S300, and terminates the processing.

According to the response from the control CPU unit 1, the peripheral device 3 can check whether or not the processing based on the command issued by the peripheral device 3 has been normally executed by the control or standby CPU unit 1 or 100.

Next, file batch write processing will be discussed with reference to a flowchart in FIG. 4.

Figure 4:
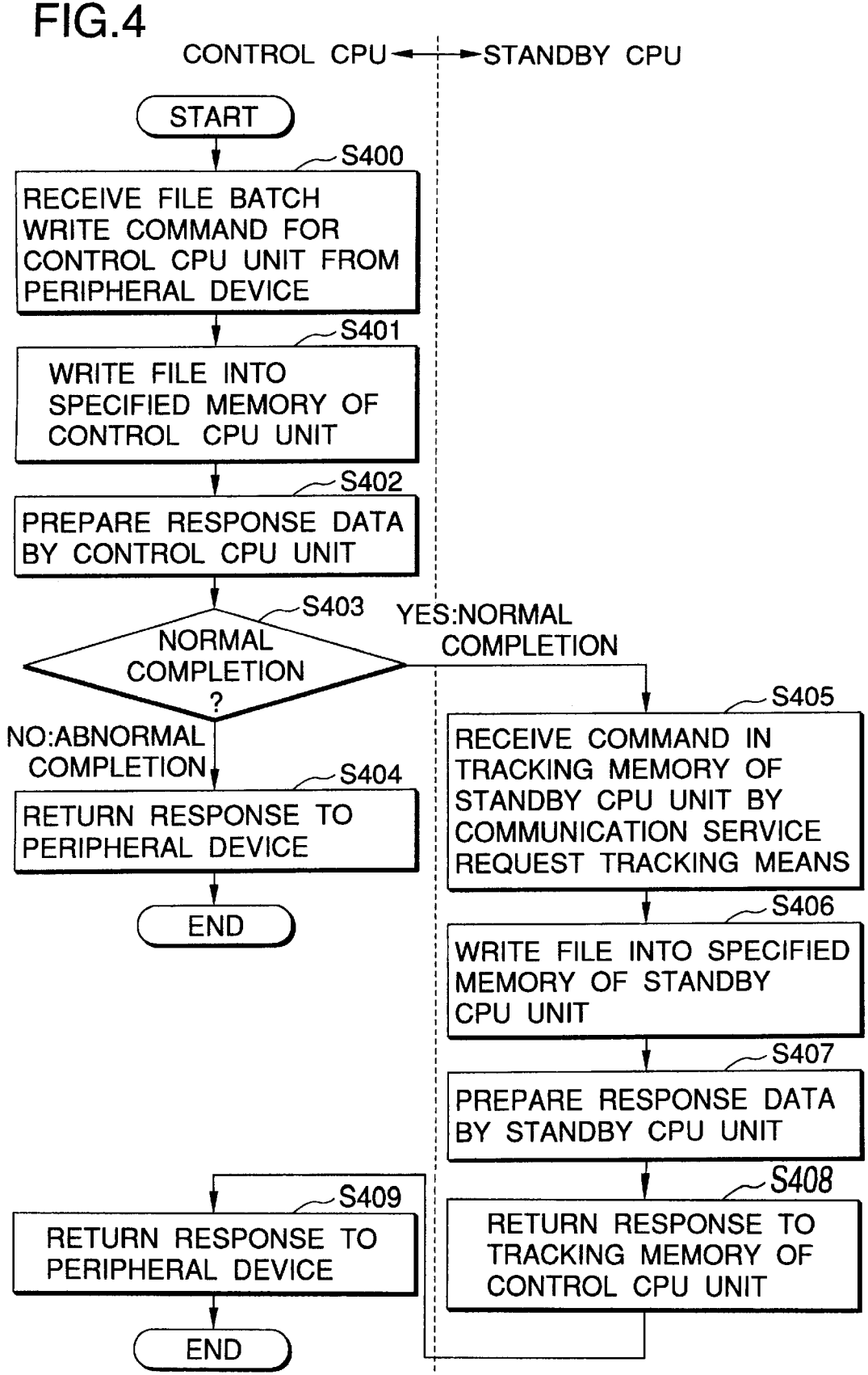
FIG. 4 is a flowchart to show the operation of executing file batch write at the same time in both control and standby CPU units in the first embodiment of the invention.

An instruction for starting the file batch write means 22 of the communication service function 20 and a command to which the file to be written is attached are issued from the peripheral device 3 connected to the control CPU unit 1, whereby the flowchart shown in FIG. 4 is started. At step S400, the CPU 11 of the control CPU unit 1 receives a command through the peripheral interface 19 from the peripheral device 3, whereby control goes to step S401.

At step S401, the CPU 11 interprets a statement at the top of the transmitted command and reads and executes a program of the file batch write means 22 in the microprogram ROM 12. The program of the file batch write means 22 writes the file attached to the statement into a predetermined area of the external memory 2 or program memory 15 specified in the statement.

When the file is written into the predetermined area of the external memory 2 or the program memory 15 by the file batch write means 22, whether or not operation code of a program and attached information in the transmitted file are within a predetermined range is checked by the function of the CPU 11 based on the file batch write means 22.

At step S402, response data indicating the normal or abnormal completion of the command execution is prepared and control goes to step S403.

At step S403, whether or not the command processing is normally complete is checked. If the command processing is abnormally complete, control goes to step S404 at which a notification indicating that the command for the control CPU unit 1 results in failure is returned, and the process is terminated.

If the command processing is normally complete, the response prepared at step S402 is discarded and the communication service request tracking means 41 for transferring the same command as the command transmitted from the peripheral device 3 to the standby CPU unit 100 is started from the microprogram ROM 2.

The CPU 11 fetches the command transmitted from the peripheral device 3 from the system memory 14 storing the command and issues the command to the tracking memory 106 of the standby CPU unit 100 through the tracking interface by the communication service request tracking means 41.

When the standby CPU unit 100 receives the command transferred to the tracking memory 106 at step S405, control goes to step S406.

At step S406, the CPU 101 interprets the statement of the command received in the tracking memory 106 and recognizes that the command is file batch write from the control CPU unit 1.

The CPU 101 reads and executes the program of the file batch write means in the microprogram ROM 102 and writes the attached file into a predetermined area of the external memory 200 or program memory 105 specified in the statement.

In the write processing in the standby CPU unit 100, a check is also made by the function of the CPU 101 based on the file batch write means executed by the control CPU unit 1.

At step S407, response data indicating the normal or abnormal completion of the command execution is prepared. Then, at step S408, the response data is transferred to the tracking memory 16 of the control CPU unit 1 through the tracking interface.

Upon reception of the response data indicating the normal or abnormal completion from the standby CPU unit 100, the control CPU unit 1 returns the received response data to the peripheral device 3 at step S409, and terminates the processing.

According to the embodiment, for the former processing wherein the peripheral machine 3 is connected separately to the control and standby CPU units 1 and 100 for writing files, the communication service request tracking means as the CPU function is provided, whereby when one command is issued from the peripheral machine, the control CPU unit 1 can also transmit the same command to the standby CPU unit 100 for writing files into the control and standby CPU units 1 and 100 in batch. Thus, the user work efficiency for program change at the system start-up time, etc., can be improved.

When files are written in batch, a response from the standby CPU unit 100 is transmitted to the peripheral machine which can check whether or not the files can be reliably written; reliability presenting a problem when a program is transmitted over a communication line can also be considered. Thus, as a feature of the redundancy system, when the control CPU unit 1 goes down, the standby CPU unit 100 can control the controlled machines successively by the same program.

Further, unlike the conventional tracking, file write can be executed independently of the specified area of the memory for tracking, etc.

Embodiment 2

In a second embodiment of the invention, the operation of executing device batch write at the same time in both control and standby CPU units will be discussed with reference to FIG. 5.

Figure 5:
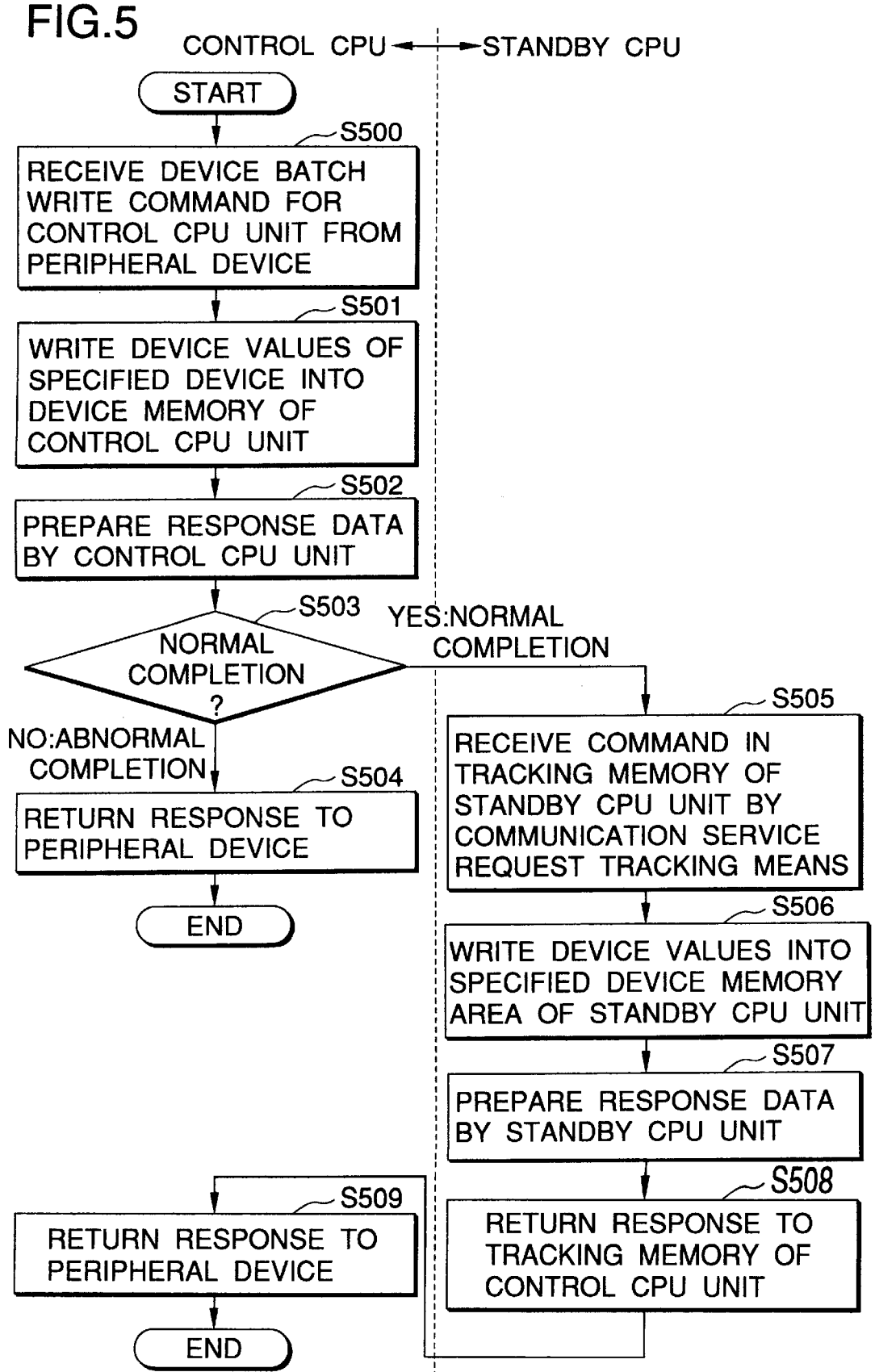
FIG. 5 is a flowchart to show the operation of executing device batch write at the same time in both control and standby CPU units in a second embodiment of the invention.

An instruction for starting the device batch write means 23 of the communication service function 20 and a command to which the file to be written is attached are issued from the peripheral device 3 connected to the control CPU unit 1, whereby a flowchart shown in FIG. 5 is started. At step S500, the CPU 11 of the control CPU unit 1 receives a command through the peripheral interface 19 from the peripheral device 3, whereby control goes to step S501.

At step S501, the CPU 11 interprets a statement at the top of the tranmitted command and reads and executes a program of the device batch write means 23 in the microprogram ROM 12. The program of the device batch write means 23 writes the device information to be written, attached to the statement into a predetermined area of the device memory 13 specified in the statement.

When the device information is written into the predetermined area of the device memory 13 by the device batch write means 23, whether or not the top device whose device information is to be written and the last device found from the top device and the number of points are within the device range set in a parameter is checked by the function of the CPU 11 based on the device batch write means 23.

At step S502, response data indicating the normal or abnormal completion of the command execution is prepared and control goes to step S503.

At step S503, whether or not the command processing is normally complete is checked. If the command processing is abnormally complete, control goes to step S504 at which a notification indicating that the command for the control CPU unit 1 results in failure is returned, and the process is terminated.

If the command processing is normally complete, the response prepared at step S502 is discarded and the communication service request tracking means 41 for transferring the same command as the command transmitted from the peripheral device 3 to the standby CPU unit 100 is started from the microprogram ROM 2.

The CPU 11 fetches the command transmitted from the peripheral device 3 from the system memory 14 storing the command and issues the command to the tracking memory 106 of the standby CPU unit 100 through the tracking interface by the communication service request tracking means 41.

When the standby CPU unit 100 receives the command transferred to the tracking memory 106 at step S505, control goes to step S506.

At step S506, the CPU 101 interprets the statement of the command received in the tracking memory 106 and recognizes that the command is device batch write from the control CPU unit 1.

The CPU 101 reads and executes the program of the device batch write means in the microprogram ROM 102 and writes the attached file into a predetermined area of the device memory 103 specified in the statement.

In the write processing in the standby CPU unit 100, a check is also made by the function of the CPU 101 based on the device batch write means executed by the control CPU unit 1.

At step S507, response data indicating the normal or abnormal completion of the command execution is prepared. Then, at step S508, the response data is transferred to the tracking memory 16 of the control CPU unit 1 through the tracking interface.

Upon reception of the response data indicating the normal or abnormal completion from the standby CPU unit 100, at step S509 the control CPU unit 1 returns the received response data to the peripheral device 3 issuing the command of the communication service function 20 to the control CPU unit 1, and terminates the processing.

According to the embodiment, for the former processing wherein the peripheral machine 3 is connected separately to the control and standby CPU units 1 and 100 for writing files, the communication service request tracking means as the CPU function is provided, whereby when one command is issued, the control CPU unit 1 can transmit the same command to the standby CPU unit 100 too for writing device values, namely, device information into the control and standby CPU units 1 and 100 in batch; the user work efficiency for program change at the system start-up time, etc., can be improved.

When files are written in batch, a response from the standby CPU unit 100 is transmitted to the peripheral machine at which whether or not the information can be written reliably can be checked; reliability presenting a problem when data is transmitted over a communication line can also be considered.

Further, unlike the conventional tracking, device information write can be executed independently of the tracking specification area of the memory for storing device data, etc. That is, if tracked device data is across a plurality of tracking specification areas, device data can be written in batch for holding the identity of the device information and when the control CPU unit 1 goes down, the standby CPU unit 100 can control the controlled machines successively as a feature of the redundancy system.

Embodiment 3

Figure 6:
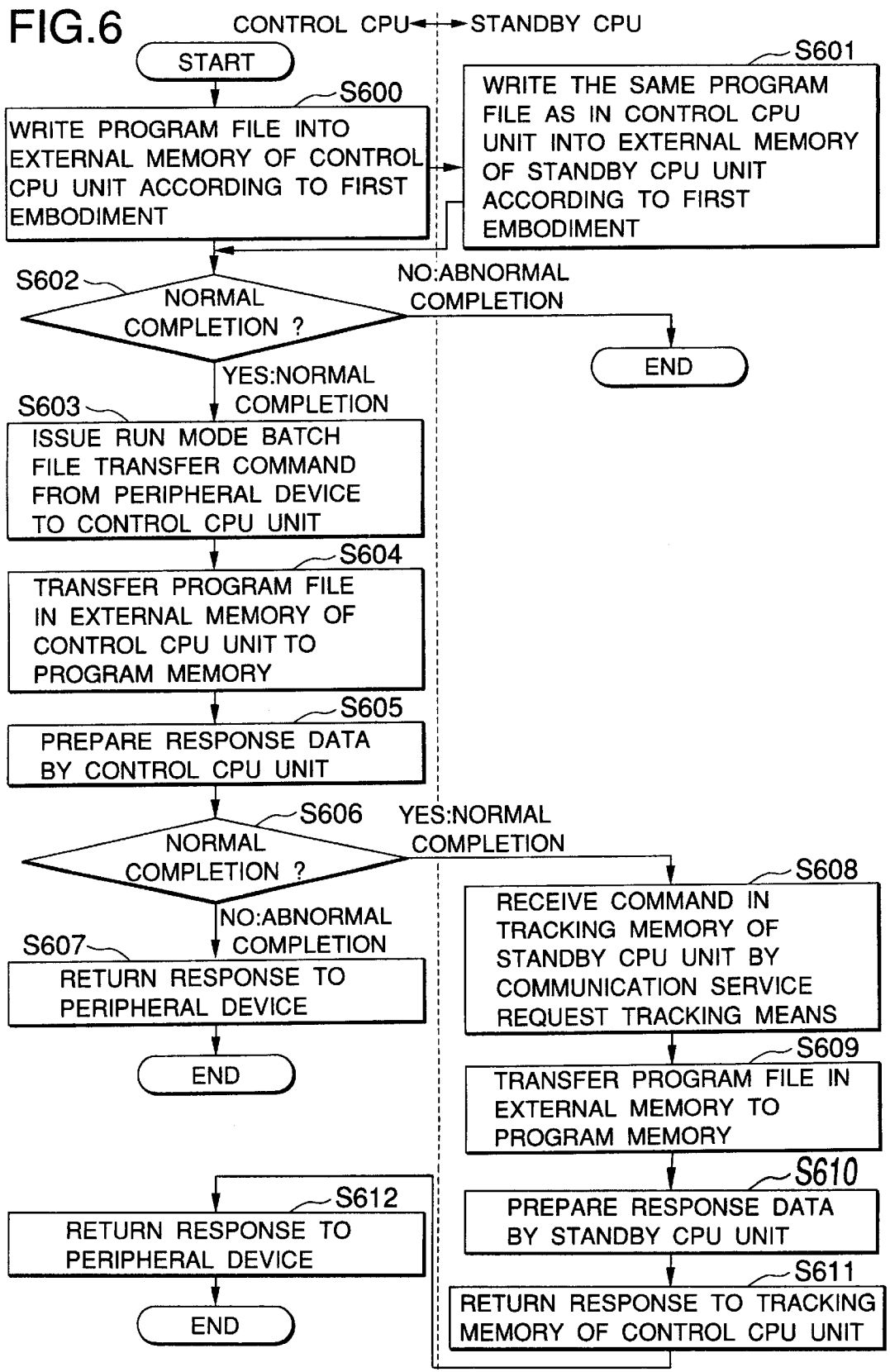
FIG. 6 is a flowchart to show the operation of executing RUN mode batch file transfer at the same time in both control and standby CPU units in a third embodiment of the invention.

In a third embodiment of the invention, the operation of executing RUN mode batch file transfer at the same time in both control and standby CPU units will be discussed with reference to FIG. 6.

In the third embodiment, file batch write into the control and standby CPU units 1 and 100 from the peripheral device 3 is once executed into the external memories 2 and 200 according to the processing shown in the first embodiment, then the written files are restored in the program memories 15 and 105 via the internal bus in batch at the END processing time during the program RUN mode.

A specific processing procedure will be discussed with reference to FIG. 6.

First, at step S600, an instruction for starting the file batch write means 22 of the communication service function 20 and a command to which the file to be written is attached are issued, whereby the flowchart shown in FIG. 4 is started. As in the first embodiment, the file batch write means 22 writes the program file to be changed during the RUN mode into the external memories 2 and 200 of both the control and standby CPU units not affecting the program execution at step S601.

At step S602, whether or not the program file write into the control and standby CPU units 1 and 100 is normally complete is determined based on response data from the control or standby CPU unit 1 or 100. If the response data indicates abnormal completion, the process is terminated.

When the peripheral machine 3 detects the normal completion of the file batch write into the external memories 2 and 200 of the control and standby CPU units 1 and 100 according to the response data transmitted through the control CPU unit 1, it issues a command for starting the RUN mode batch file transfer means 26 to the control CPU unit 1 of the standby redundancy system.

When the control CPU unit 1 receives the command of the RUN mode batch file transfer means 26 from the peripheral device 3, it interprets the instruction of the command and goes to step S604 for reading and executing the program of the RUN mode batch file transfer means 26 in the microprogram ROM 2.

The program based on the RUN mode batch file transfer means 26 transfers the program file stored in the external memory 2 to a predetermined area of the program memory 15 via the internal bus, etc., connected during the RUM mode, namely, at the END processing time.

When the RUN mode batch file transfer means 26 transfers a program file from the external memory 2 to a predetermined area of the program memory 15, the function of the CPU 11 based on the RUN mode batch file transfer means 26 is executed to check whether or not operation code of the program in the file and attached information are within a predetermined range and whether or not a new transferred program can be executed normally with no problem in setting, etc., as a result of sequential execution of program in the file for one scan.

Since program file transfer during the RUN mode is internal processing for transferring the program file from the external memory 2 via the internal bus, etc., to the program memory 15, the time required for transferring the file is shorter than the file transfer time from the peripheral device 3 to the external memory 2 of the target CPU unit 1 over the communication line at step S600, and the program file transfer during the RUN mode can be executed at high speed. Thus, a large-capacity program in the program memory 15 can be changed in batch during the RUN mode.

At step S605, response data indicating the normal or abnormal completion of the command execution is prepared and control goes to step S606.

At step S606, whether or not the command processing is normally complete is checked. If the command processing is abnormally complete, control goes to step S607 at which a notification indicating that the command for the control CPU unit 1 results in failure is returned to the peripheral machine 3, and the process is terminated.

If the command processing is normally complete, the response prepared at step S605 is discarded and the communication service request tracking means 41 for transferring the same command as the command transmitted from the peripheral device 3 to the standby CPU unit 100 is started from the microprogram ROM 2.

The CPU 11 fetches the command of the RUN mode batch file transfer means 26 transmitted from the peripheral device 3 from the system memory 14 storing the command and issues the command to the tracking memory 106 of the standby CPU unit 100 through the tracking interface by the communication service request tracking means 41.

When the standby CPU unit 100 receives the command transferred to the tracking memory 106 at step S608, control goes to step S609.

At step S609, the CPU 101 interprets the statement of the command received in the tracking memory 106 and recognizes that the command is RUN mode batch file transfer from the control CPU unit 1.

The CPU 101 reads and executes the program of the RUN mode batch file transfer means in the microprogram ROM 102 and transfers the program file written into the external memory 200 at step S601 to a predetermined area of the program memory 105 via the internal bus, etc.

In the transfer processing in the standby CPU unit 100, the control CPU unit 1 also checks by the function of the CPU 101 based on the RUN mode batch file transfer means.

Since program file transfer during the RUN mode is internal processing for transferring the program file from the external memory 200 via the internal bus, etc., to the program memory 105, the time required for transferring the file is shorter than the file transfer time from the peripheral device 3 to the external memory 200 of the standby CPU unit 100 over the communication line at step S601, and the program file transfer during the RUN mode can be executed at high speed. Thus, a large-capacity program in the program memory 105 can be changed in batch during the RUN mode.

At step S610, response data indicating the normal or abnormal completion of the command execution is prepared. Then, at step S611, the response data is transferred to the tracking memory 16 of the control CPU unit 1 through the tracking interface.

Upon reception of the response data indicating the normal or abnormal completion from the standby CPU unit 100, at step S612 the control CPU unit 1 returns the received response data to the peripheral device 3 issuing the command of the communication service function 20 to the control CPU unit 1, and terminates the processing.

In the embodiment, unless the file write into the external memories of both the control and standby CPU units is abnormal completion according to the response from the control and standby CPU units 1 and 100, a RUN mode batch file write request is issued from the peripheral machine for executing RUN mode batch file write. However, the control CPU unit 1, which receives a response indicating the normal completion from the standby CPU unit 100, may issue a RUN mode batch file write request.

Command transmission to the standby CPU unit 100 means the normal completion in the control CPU unit 1. Thus, if the processing in the standby CPU unit 100 is normally complete, the processing is normally complete in both the control and standby CPU units and the standby CPU unit 100 may issue a RUN mode batch file write request to the control CPU unit 1.

According to the third embodiment, for the former processing wherein the peripheral machine 3 is connected separately to the control and standby CPU units 1 and 100 for writing files, the communication service request tracking means as the CPU function is provided, whereby when one command is issued, the control CPU unit 1 can transmit the same command to the standby CPU unit 100 too for writing files into the external memories 2 and 200 of the control and standby CPU units 1 and 100 in batch.

The program files written into the external memories 2 and 200 can be transferred to the program memories 15 and 105 in batch at high speed by internal processing with the internal bus, etc., connected to the external memories.

Thus, a program file formerly able to be written only 500K, for example, in END processing during the RUN mode can be written in batch by making the most of merits of internal processing via the bus from the external memory in the third embodiment; the controlled machines, etc., need not be placed in the STOP mode and productivity is furthermore improved.

In the standby redundancy system, it is important for the control and standby CPU units 1 and 100 to run a program at the same timing; according to the embodiment, programs can also be changed in batch at the same time, furthermore improving the reliability of the standby redundancy system.

Further, in putting programs into modules in recent years, all programs put into modules can be changed in batch for a short time during the RUN mode; work efficiency and reliability in changing programs can be improved.

When files are written in batch, a response from the standby CPU unit 100 is transmitted to the peripheral machine at which whether or not the files can be written reliably can be checked; reliability presenting a problem when a program is transmitted over a communication line can also be considered. Thus, as a feature of the redundancy system, when the control CPU unit 1 goes down, the standby CPU unit 100 can control the controlled machines successively by the same program.

Embodiment 4

Figure 7:
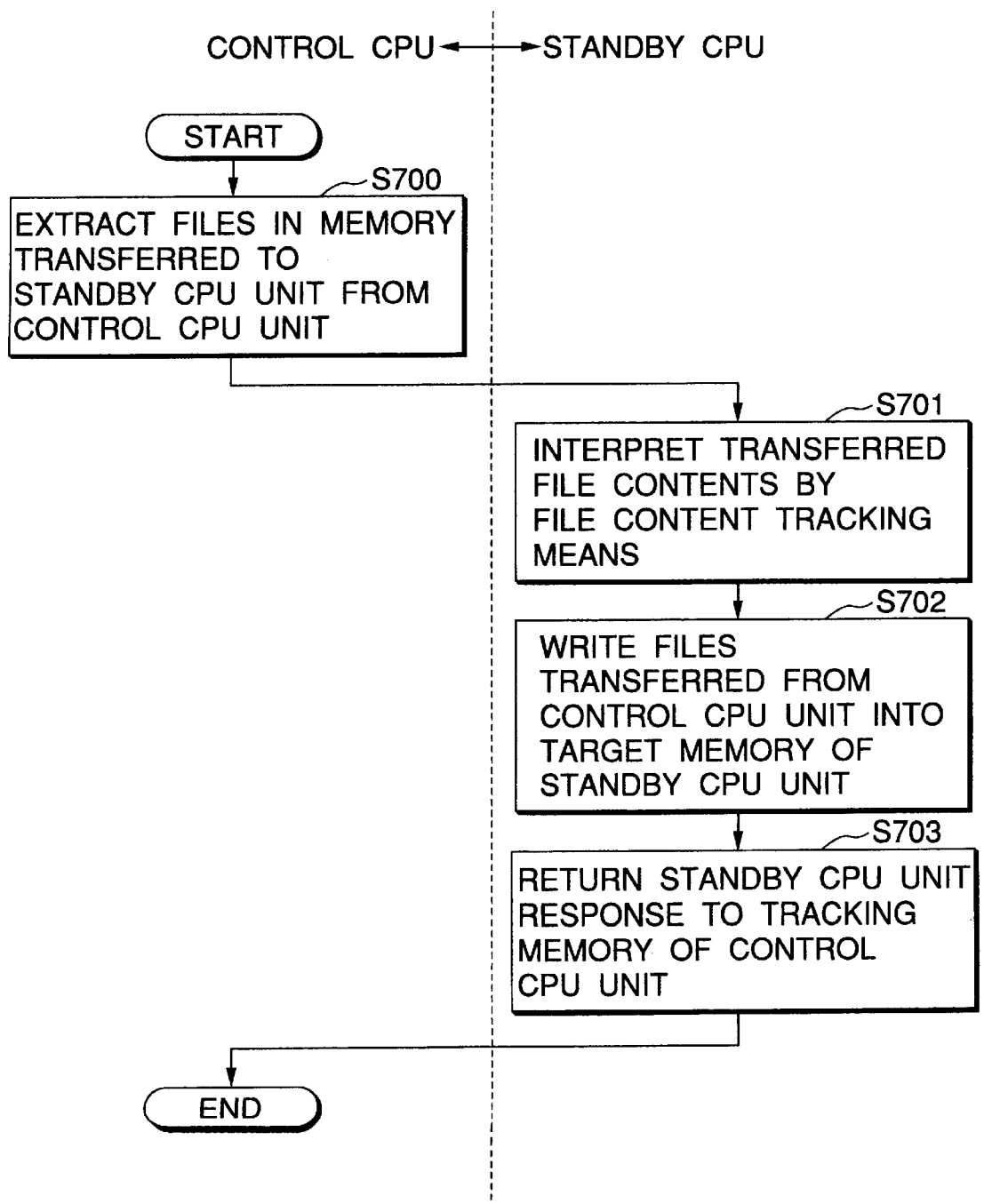
FIG. 7 is a flowchart to show the operation of automatic transfer means of file contents in a memory in a fourth embodiment of the invention.

In a fourth embodiment of the invention, the operation of executing file content tracking at the same time in both control and standby CPU units will be discussed with a flowchart started before the RUN mode, namely, during the STOP mode in the standby redundancy system in FIG. 7.

At step S700, one or more specified files in the program memory 15 or the external memory 2 to be transferred to the standby CPU unit 100 are extracted in batch in the control CPU unit 1 in the standby redundance system, and the file content tracking means 42 transfers a statement indicating file batch transfer and a command comprising the file contents to the tracking memory 106 of the standby CPU unit 100.

At step S701, the CPU 101 of the standby CPU unit 100 interprets the command transferred to the tracking memory 106 from the control CPU unit 1 and starts the file content tracking means for executing file batch transfer. Then, the CPU 101 goes to step S702 and writes the selected file or files in the program memory 15 or the external memory 2 extracted at step S700 into the target program memory 105 or external memory 200. Upon completion of the file write, the standby CPU unit 100 returns a response indicating the file write completion to the tracking memory 6 of the control CPU unit 1 at step S703.

The file content tracking function is now complete.

According to the embodiment, consistency of the control and standby CPU units 1 and 100 for each file can be provided. Thus, in portions in which identity cannot be held in the conventional tracking data only in the target areas in a file, the identity is held for each file, whereby the data identity in the standby redundancy system is furthermore improved and the reliability of the system is furthermore enhanced.

Further, the time required for tracking data across a plurality of locations can be shortened because data can be tracked in batch.

Formerly, the peripheral machine 3 was connected separately to the control and standby CPU units for holding the identity for each file. However, this step becomes unnecessary and work efficiency is improved.

Embodiment 5

Figure 8:
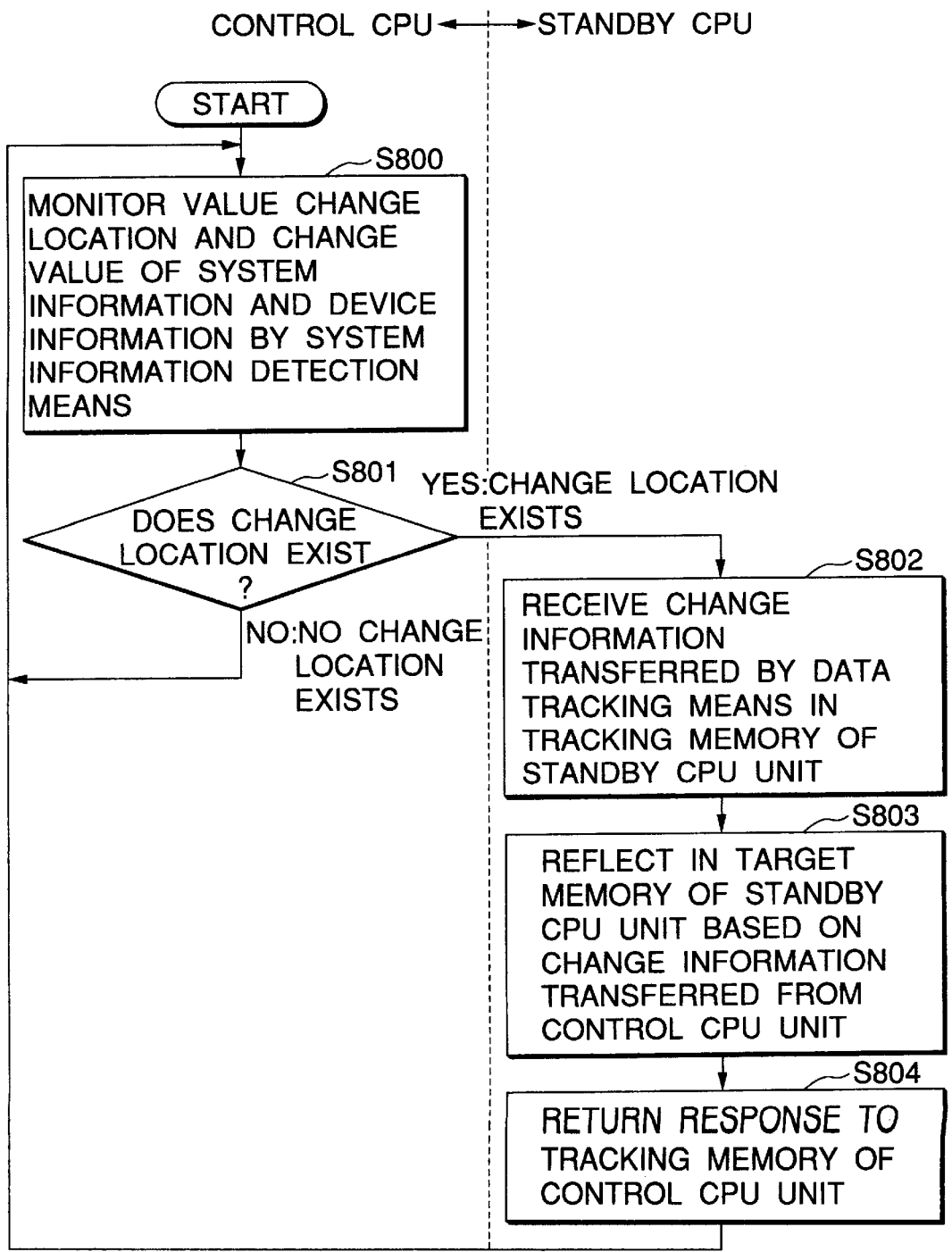
FIG. 8 is a flowchart to show the operation of automatic transfer means of system information in a fifth embodiment of the invention.

In a fifth embodiment of the invention, the operation of automatic transfer means of system information will be discussed with a flowchart started during the RUN mode in the standby redundancy system in FIG. 8.

At step S800, the CPU 11 of the control CPU unit 1 in the standby redundancy system always monitors value change in system information in the system memory 14, device information in the device memory 3, and file register information in the external memory 2 based on the system information detection means 31 in the microprogram ROM 12. Specifically, a predetermined area is provided in the system memory 14 and each time a memory value is changed (a value is written), the write address and the new value are stored in the area at the same time by the function of the CPU 11 based on the system information detection means 31.

At step S801, if value change occurs as a result of interpretation in the system memory 14, the control CPU unit 1 transfers the updated information location and value change information to the tracking memory 106 of the standby CPU unit 100 by the data tracking means 43.

Upon reception of the updated information storage location and value change information transferred by the data tracking means 43 in the tracking memory 106 at step S802, the standby CPU unit 100 goes to step S803 and reflects the new value in the memory corresponding to the updated memory of the control CPU unit 1 (device memory, program memory, or external memory) according to the change information. Upon completion of the step, the standby CPU unit 100 returns a response indicating the completion to the tracking memory 16 of the control CPU unit 1 at step S804. The automatic tracking function of the system information is now complete.

According to the fifth embodiment, only changed memory data is automatically transmitted to the associated CPU unit as tracking data. Thus, unlike the conventional system, data set in all areas is not transmitted as tracking data and necessary data only in the change portion can be tracked; the tracking time can be shortened and extra tracking processing does not occur. Therefore, only processing involving change can be tracked and reflected in the standby CPU unit at high speed.

Further, only change portions can also be tracked; the user need not previously examine the device range for tracking and work efficiency is also improved.

Embodiment 6

Figure 9:
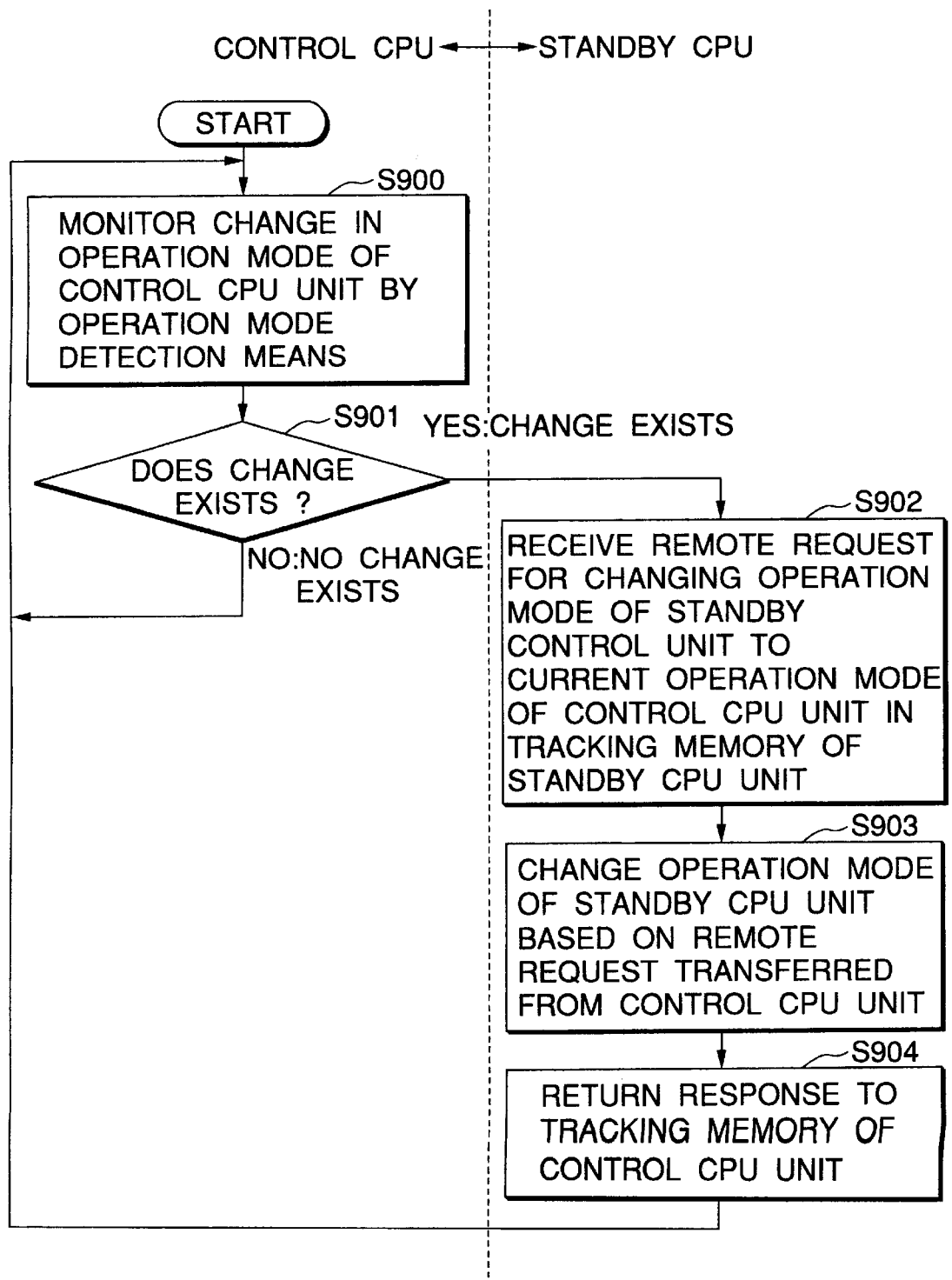
FIG. 9 is a flowchart to show the operation of automatic operation mode follow-up means in a sixth embodiment of the invention.
Figure 10:
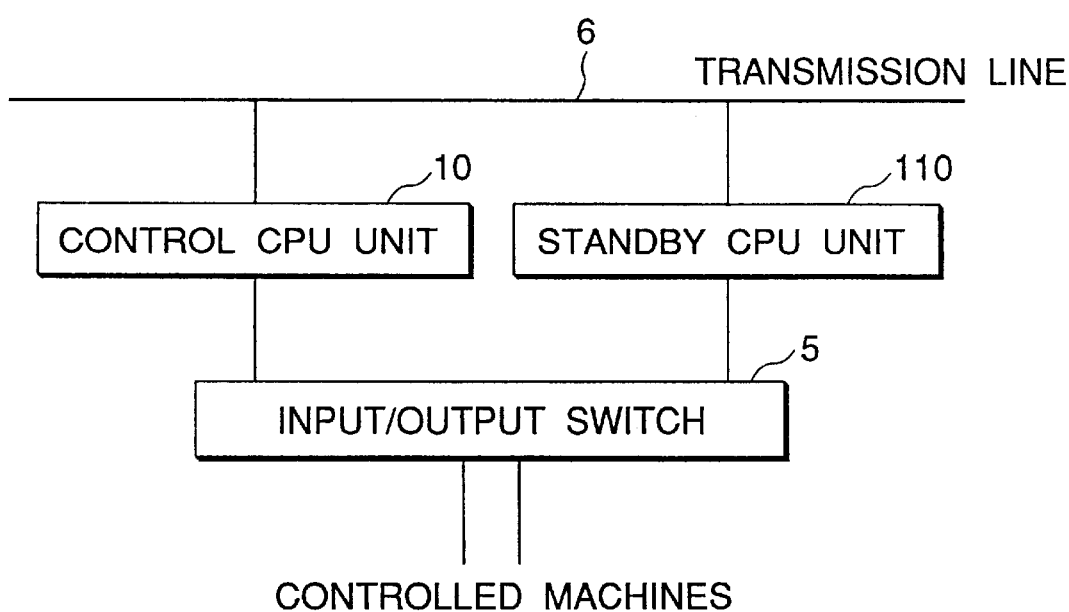
FIG. 10 is a block diagram to show the configuration of a conventional standby redundancy system.
Figure 11:
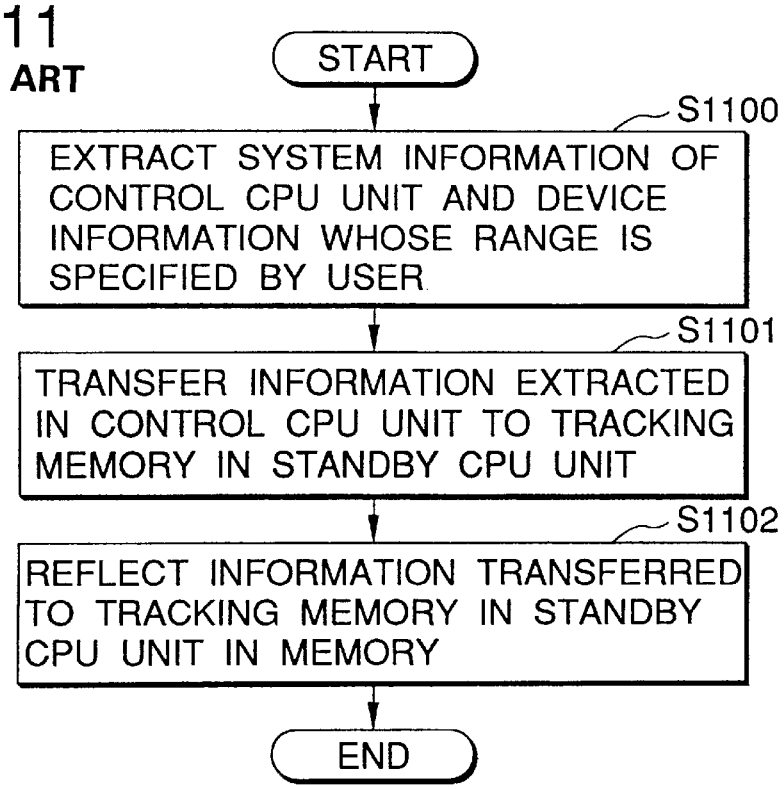
FIG. 11 is a flowchart to show the data tracking operation in the conventional standby redundancy system.
Figure 12:
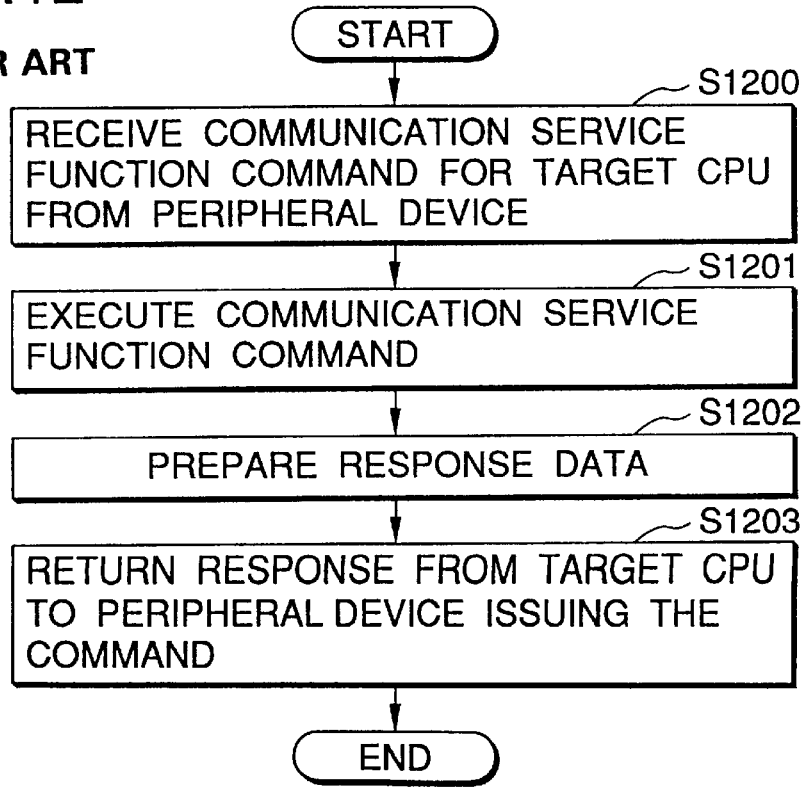
FIG. 12 is a flowchart to show conventional communication service request function operation.
Figure 13A:
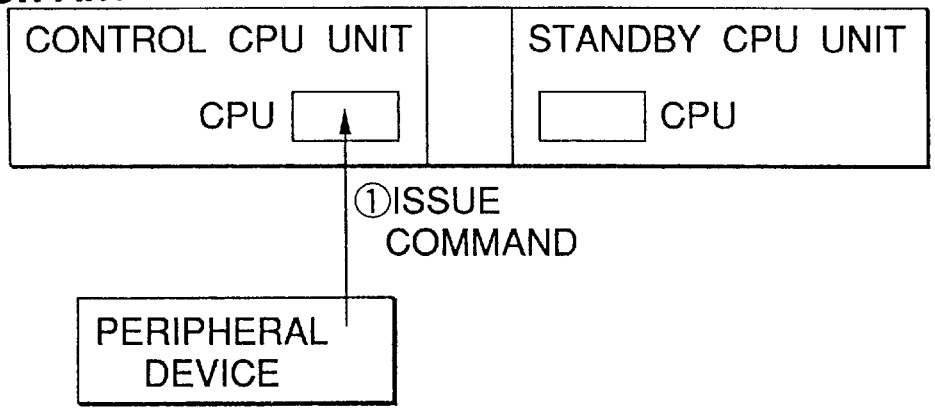
FIGS. 13A to 13C show procedures to execute the conventional communication service request function for the standby redundancy system.
Figure 13B:
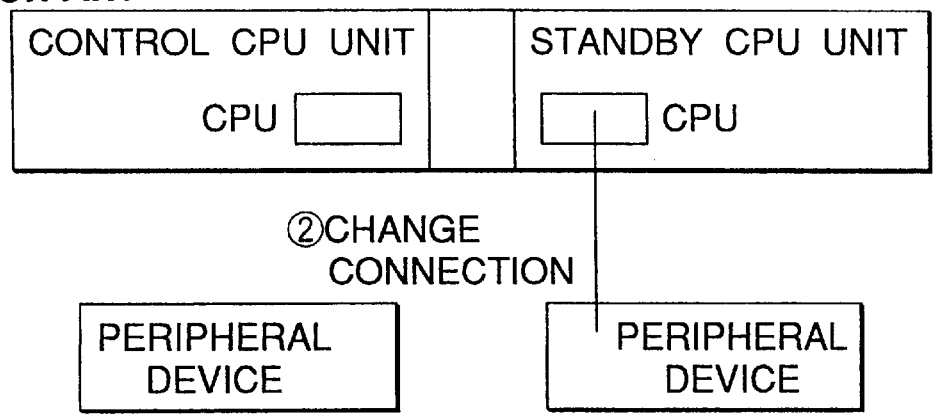
Figure 13C:
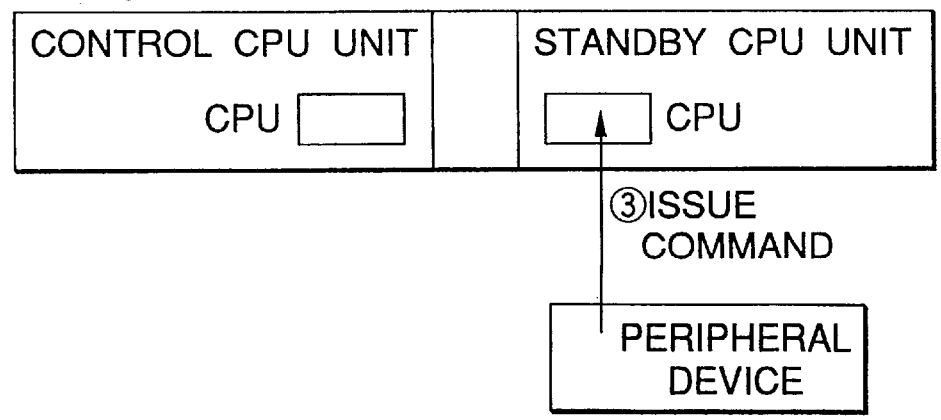

In a sixth embodiment of the invention, the operation of automatic follow-up means of the operation mode will be discussed with a flowchart started in the standby redundancy system in FIG. 9.

At step S900, the CPU 11 of the control CPU unit 1 in the standby redundancy system always monitors change in the operation mode of the control CPU unit 1 stored in an area of the system memory 14 based on the operation mode detection means 32 in the microprogram ROM 12. Specifically, an operation mode history of the control CPU unit 1 (mode before one scan) is held in a predetermined area of the system memory 14 and the data is compared with the current operation mode.

If the operation mode changes as a result of the operation mode comparison result at step S901, the control CPU unit 1 transfers a request for the operation mode change means 21 for changing the operation mode of the standby CPU unit 100 to the current operation mode of the control CPU unit 1 to the tracking memory 106 of the standby CPU unit 100 by the communication service request tracking means 33.

Upon reception of the operation mode change request transferred by the data tracking means in the tracking memory 106 of the standby CPU unit 100 at step S902, the standby CPU unit 100 goes to step S903.

At step S903, the CPU 101 based on the operation mode change means 21 changes the standby CPU unit 100 to the same operation mode as the current operation mode of the control CPU unit 1. Upon completion of changing the operation mode, the standby CPU unit 100 returns a response indicating the completion to the tracking memory 6 of the control CPU unit 1 at step S904. The automatic operation mode follow-up function is now complete.

According to the sixth embodiment, the data indicating the automatically changed operation mode of the control CPU unit 1 is transmitted to the standby CPU unit 100 as a command, and the standby CPU unit 100 enters the same operation mode as the control CPU unit 1 based on the command. Thus, the operation mode of the standby CPU unit can automatically follow up change in the operation mode of the control CPU unit for always holding the operation modes of both the control and standby CPU units the same and maintaining the standby redundancy system more efficiently without shifting the operation mode change timing.

The invention produces the following effects according to the configurations described so far:

According to the invention, a standby redundancy system is provided comprising a control CPU unit for controlling controlled machines and a standby CPU unit capable of controlling the controlled machines instead of the control CPU unit, characterized by tracking means for temporarily storing a command consisting of a statement and data entered from a peripheral machine, processing the data based on the statement in the command, and transferring the temporarily stored command to the associated CPU unit. Thus, both the control and standby CPU units can process the data based on the statement in response to the command from the peripheral machine, and work efficiency for holding the data identity is improved.

The associated CPU unit to which the temporarily stored command is transferred processes the data based on the statement in the command, detects an error in the command, and returns a notification indicating the error to the peripheral machine through the CPU unit transferring the command. Thus, the reliability of the data identity is furthermore improved.

A standby redundancy system is provided comprising a first CPU unit for temporarily storing a command consisting of a statement and a program entered from a peripheral machine, storing the program in a first external memory internally connected based on the statement in the command while checking the command for error, and transferring the temporarily stored command to a second CPU unit, and a second CPU unit for storing the program in a second external memory internally connected based on the statement in the transferred command while checking the command for error, and returning the check result to the first CPU unit, characterized in that the program stored in the first and second external memories is written into the corresponding memories during the RUN mode based on a sequence program. Thus, a large-capacity program can be written in batch during the RUN mode from the external memory and STOP processing formerly required for writing a program need not be performed, so that the work time can be shortened.

Further, the error check is made by scanning the program. Thus, the reliability of the program can be enhanced by scanning before write during the RUN mode.

If an error is not detected in the first or second CPU unit, the program stored in the first and second external memories is written into the corresponding memories during the RUN mode in response to a request issued from the peripheral machine. Thus, the program can be written into both the control and standby CPU units in synchronization and the reliability of the standby redundancy system itself is furthermore improved.

If an error is not detected in the first or second CPU unit, the program stored in the first and second external memories is written into the corresponding memories during the RUN mode in response to a request issued from the first or second CPU unit. Thus, the program can be written into both the control and standby CPU units in synchronization and the reliability of the standby redundancy system itself is furthermore improved.

A standby redundancy system is provided comprising a control CPU unit for controlling controlled machines and a standby CPU unit capable of controlling the controlled machines instead of the control CPU unit, characterized in that change in data in a predetermined area of an internal memory is detected, a change detection address and updated data are stored in sequence, and only the address and updated data stored are transferred to the standby CPU unit at data tracking time. Thus, only the updated data can be adopted for the tracking data and the data transmission time and load can be reduced, improving work efficiency.

A standby redundancy system is provided comprising a control CPU unit for controlling controlled machines and a standby CPU unit capable of controlling the controlled machines instead of the control CPU unit, characterized in that the operation state of the control CPU unit is stored for each scan and each time the scan terminates, the current operation state is compared with the operation state set before one scan and if operation state change is detected, a command for changing the operation state is issued to the standby CPU unit. Thus, the operation state of the standby CPU unit can be changed following the control CPU unit and the reliability of the standby redundancy system itself is furthermore improved.

While specific embodiments have been described, it should be understood that the present invention is not limited to those embodiments, but may variously be modified, altered and changed within the scope of the present invention.

What is claimed is:

1. A standby redundancy system for peripheral devices, comprising:

a control CPU for controlling the peripheral devices;

a standby CPU for controlling the peripheral devices in replacement of said control CPU;

a tracking memory for temporarily storing a command including a statement and data entered from one of the peripheral devices;

said control CPU processing the data based on the statement in the command; and a tracking interface for transferring the temporarily stored command to said standby CPU, wherein the standby CPU, to which the temporarily stored command is transferred, processes the data based on the statement in the command, and returns a notification via the tracking interface to the tracking memory of the control CPU and said control CPU returns a response to said peripheral device.

2. A standby redundancy system, comprising:

a control CPU unit for controlling controlled machines;

a standby CPU unit capable of controlling the controlled machines in replacement of said control CPU unit; and tracking means for temporarily storing a command including a statement and data entered from a controlled machine, processing the data based on the statement in the command, and transferring the temporarily stored command to the standby CPU unit wherein the standby CPU unit to which the temporarily stored command is transferred processes the data based on the statement in the command, detects an error in the command, and returns a notification indicating the error to the controlled machine through the control CPU unit.

3. A standby redundancy system, comprising:

a first CPU unit for temporarily storing a command comprising a statement and a program entered from a peripheral machine, storing the program in a first external memory internally connected based on the statement in the command while checking the command for error, and transferring the temporarily stored command to a second CPU unit; and a second CPU unit for storing the program in a second external memory internally connected based on the statement in the transferred command while checking the command for error, and returning the check result to said first CPU unit;

wherein the program stored in the first and second external memories is written into corresponding memories during a RUN mode based on a sequence program.

4. The standby redundancy system as claimed in claim 3 wherein the error check is made by scanning the program.

5. The standby redundancy system as claimed in claim 3 wherein if an error is not detected in said first or second CPU units, the program stored in the first and second external memories is written into the corresponding memories during the RUN mode in response to a request issued from the peripheral machine.

6. The standby redundancy system as claimed in claim 3 wherein if an error is not detected in said first or second CPU unit, the program stored in the first and second external memories is written into the corresponding memories during the RUN mode in response to a request issued from one of said first and second CPU unit.

7. A standby redundancy system, comprising:

a control CPU unit for controlling controlled machines; and a standby CPU unit capable of controlling the controlled machines instead of said control CPU unit;

wherein if a change in data in a predetermined area of an internal memory is detected, a change detection address and updated data are stored in sequence, and only the address and updated data stored are transferred to said standby CPU unit at data tracking time.

8. A standby redundancy system, comprising:

a control CPU unit for controlling controlled machines; and a standby CPU unit capable of controlling the controlled machines instead of said control CPU unit;

wherein an operation state of said control CPU unit is stored for each scan and each time the scan terminates, the current operation state is compared with the operation state set before one scan and if an operation state change is detected, a command for changing the operation state is issued to said standby CPU unit.

* * * * *